United States Patent
Matsuo et al.

(10) Patent No.: US 11,307,288 B2
(45) Date of Patent: Apr. 19, 2022

(54) OBJECT SENSING APPARATUS, OBJECT SENSING METHOD, AND COMPUTER READABLE RECORDING MEDIUM

(71) Applicant: NEC Corporation, Tokyo (JP)

(72) Inventors: Daisuke Matsuo, Tokyo (JP); Shingo Yamanouchi, Tokyo (JP); Masayuki Ariyoshi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 318 days.

(21) Appl. No.: 16/483,475

(22) PCT Filed: Feb. 6, 2017

(86) PCT No.: PCT/JP2017/004283
§ 371 (c)(1),
(2) Date: Aug. 5, 2019

(87) PCT Pub. No.: WO2018/142629
PCT Pub. Date: Aug. 9, 2018

(65) Prior Publication Data
US 2020/0018821 A1 Jan. 16, 2020

(51) Int. Cl.
*G01S 7/292* (2006.01)
*G01S 7/282* (2006.01)
(Continued)

(52) U.S. Cl.
CPC .......... *G01S 7/2923* (2013.01); *G01S 7/282* (2013.01); *G01S 7/354* (2013.01); *G01S 13/34* (2013.01); *G01S 13/42* (2013.01); *G01S 13/582* (2013.01)

(58) Field of Classification Search
CPC ........ G01S 7/2923; G01S 7/282; G01S 7/354; G01S 13/34; G01S 13/42; G01S 13/582
(Continued)

(56) References Cited

U.S. PATENT DOCUMENTS

2010/0214153 A1* 8/2010 Kikuchi ............... G01S 13/345
342/70
2011/0025546 A1* 2/2011 Cook .................... G01S 13/534
342/22
(Continued)

FOREIGN PATENT DOCUMENTS

JP 2001-116839 A 4/2001
JP 2003-177178 A 6/2003
(Continued)

OTHER PUBLICATIONS

Japanese Office Action for JP Application No. 2018-565238 dated Dec. 8, 2020 with English Translation.
(Continued)

*Primary Examiner* — Donald H B Braswell

(57) ABSTRACT

An object sensing apparatus 1 includes: an emission unit 11 configured to emit an RF transmission signal as an electromagnetic wave for object sensing; a reception unit 21 configured to receive a reflected wave of the RF transmission signal as an RF reception signal, and use the RF transmission signal to generate a demodulated signal based on the RF reception signal; a distance detection unit 22 configured to detect a distance to the object that reflected the RF transmission signal based on the range spectrum calculated based on the demodulated signal; a behavior detection unit 23 configured to detect behavior of the object based on the range spectrum; a fixed object specifying unit 24 configured to specify a fixed object from among detected objects based on the distance and behavior; and a virtual image specifying unit 25 configured to, if there are two or
(Continued)

more objects other than the fixed object among the detected objects, calculate a degree of similarity in the change over time in the behavior for each combination of the objects other than the fixed object, and specify a virtual image based on the degree of similarity.

7 Claims, 10 Drawing Sheets

(51) Int. Cl.
    *G01S 7/35* (2006.01)
    *G01S 13/34* (2006.01)
    *G01S 13/42* (2006.01)
    *G01S 13/58* (2006.01)

(58) Field of Classification Search
    USPC .......................................................... 342/105
    See application file for complete search history.

(56) References Cited

U.S. PATENT DOCUMENTS

| | | | | |
|---|---|---|---|---|
| 2015/0301167 A1* | 10/2015 | Sentelle | ............... | G01S 13/888 342/22 |
| 2017/0139042 A1* | 5/2017 | Alen | ..................... | G01S 7/2921 |
| 2019/0056498 A1* | 2/2019 | Sonn | ..................... | G01S 17/931 |

FOREIGN PATENT DOCUMENTS

| | | |
|---|---|---|
| JP | 2005-351877 A | 12/2005 |
| JP | 2006-300536 A | 11/2006 |
| JP | 2009-079917 A | 4/2009 |
| JP | 2009-133761 A | 6/2009 |
| JP | 2010-175430 A | 8/2010 |
| JP | 2011-214866 A | 10/2011 |
| JP | 2016-166790 A | 9/2016 |

OTHER PUBLICATIONS

Yamaguchi et al., "A 24 GHz Band FM-CW Radar System for Detecting Closed Multiple Targets with Small Displacement", The Seventh International Conference on Ubiquitous and Future Networks (ICUFN 2015), pp. 268-273, Jul. 2015, 6 pages total.

Yamanouchi et al., "Multiple-object Recognition Radar Based on Multiple-peak Interferometry", Proceeding of the 2016 Communication Society Conference of IEICE, p. 411, Sep. 2016, 1 page total.

Matsuo et al., "Experimental Verification of Multiple-object Recognition Radar Based on Multiple-peak Interferometry", Proceeding of the 2016 Communication Society Conference of IEICE, p. 412, Sep. 2016, 1 page total.

International Search Report dated May 16, 2017 issued by the International Searching Authority in International Application No. PCT/JP2017/004283.

Written Opinion dated May 16, 2017 issued by the International Searching Authority in International application No. PCT/JP2017/004283.

* cited by examiner

OBJECT SENSING APPARATUS, OBJECT SENSING METHOD, AND COMPUTER READABLE RECORDING MEDIUM

This application is a National Stage Entry of PCT/JP2017/004283 filed on Feb. 6, 2017, the contents of all of which are incorporated herein by reference, in their entirety.

TECHNICAL FIELD

The present invention relates to an object sensing apparatus and an object sensing method for sensing an object using electromagnetic waves, and further relates to a computer readable recording medium storing a program for realizing the object sensing apparatus and the object sensing method.

BACKGROUND ART

Conventionally, a sensing method using radar technology has been known as a method for sensing an object in a state in which it is difficult to sense an object using eyesight or a camera, such as during night-time, during bad weather, in an environment in which there is a wall blocking the field of view, or the like.

For example, Non-Patent Document 1 discloses a technique for sensing multiple target objects using radar of an FMCW (Frequency Modulated Continuous Wave) scheme. Also, according to the technique disclosed in Non-Patent Document 1, it is also possible to measure minute displacement of the sensed target objects by using the change in phase of the received signal.

Also, in a radar apparatus that senses a target object based on an electromagnetic wave reflected by the target object, a virtual image of the target object appears at a position that is different from the position at which the target object actually exists due to the reflection of the electromagnetic wave by a fixed object such as a wall, and the virtual image is erroneously sensed as the target object in some cases. For this reason, Patent Document 1 discloses a technique for accurately detecting a target object by specifying a virtual image based on the positional relationship between the sensed target image and the fixed object.

LIST OF PRIOR ART DOCUMENTS

Patent Document

Patent Document 1: JP 2016-166790A

Non-Patent Document

Non-Patent Document 1: K. Yamaguchi, M. Saito, T. Akiyama, T. Kobayashi and H. Matsue, "A 24 GHz band FM-CW radar system for detecting closed multiple targets with small displacement," The Seventh International Conference on Ubiquitous and Future Networks (ICUFN 2015), pp. 268-273, July 2015

SUMMARY OF INVENTION

Problems to be Solved by the Invention

Incidentally, in the above-described Patent Document 1, the combination of the target object and its virtual image is specified by calculating a transmission path of the electromagnetic wave using, for example, a ray trace method based on the positional relationship between the sensed target object and the fixed object. In this kind of case, the positions and the shapes of the target object and the fixed object need to be kept track of accurately, and thus a high positioning resolution is required.

However, for example, if an object is sensed using a technique with an FMCW scheme disclosed in Non-Patent Document 1, the distance resolution is set at c/(2BW), and therefore the value is greater compared to the wavelength (c is the speed of light, BW is the bandwidth of the RF signal).

For example, if the RF frequency is in a 24-GHz band and the bandwidth of the RF signal is 200 MHz, the distance resolution will be 75 cm, and its value will be very large compared to the wavelength 12 mm. Also, in order to secure the angular resolution, an array antenna including a very large number of antenna elements needs to be used, which results in a complicated configuration.

That is, if common radar technology is used, it is difficult to obtain the positioning resolution that is needed in order to specify the virtual image, and realization of the radar apparatus disclosed in Patent Document 1 above is difficult. In order to realize the radar apparatus disclosed in Patent Document 1 above, complicated processing and a special apparatus are needed.

OBJECT OF THE INVENTION

An example object of the present invention is to resolve the above-described problems and to provide an object sensing apparatus, an object sensing method, and a computer readable recording medium that can specify a virtual image generated by an electromagnetic wave reflected by a fixed object, without using complicated processing or a special apparatus.

Means for Solving the Problems

In order to achieve the above-described object, an object sensing apparatus according to an example aspect of the present invention includes:

an emission unit configured to emit an RF transmission signal as an electromagnetic wave for object sensing;

a reception unit configured to receive a reflected wave of the RF transmission signal as an RF reception signal, and use the RF transmission signal to generate a demodulated signal based on the RF reception signal;

a distance detection unit configured to calculate a range spectrum based on the demodulated signal, and detect a distance from the apparatus to an object that reflected the RF transmission signal, based on the calculated range spectrum;

a behavior detection unit configured to detect behavior of the object based on the range spectrum;

a fixed object specifying unit configured to specify a fixed object from among detected objects based on the detected distance and behavior; and a virtual image specifying unit configured to, if there are two or more objects other than the fixed object among the detected objects, calculate a degree of similarity in change over time in the behavior for each combination of the objects other than the fixed object, and specify a virtual image based on the calculated degree of similarity.

Also, in order to achieve the above-described object, an object sensing method according to an example aspect of the present invention includes:

(a) a step of emitting an RF transmission signal as an electromagnetic wave for object sensing;

(b) a step of receiving a reflected wave of the RF transmission signal as an RF reception signal, and using the RF transmission signal to generate a demodulated signal based on the RF reception signal;

(c) a step of calculating a range spectrum based on the demodulated signal and detecting a distance from an object that reflected the RF transmission signal to the emitting position of the RF transmission signal or the receiving position of the RF reception signal based on the calculated range spectrum;

(d) a step of detecting behavior of the object based on the range spectrum;

(e) a step of specifying a fixed object from among detected objects based on the detected distance and behavior; and (f) a step of, if there are two or more objects other than the fixed object among the detected objects, calculating a degree of similarity in change over time in the behavior for each combination of the objects other than the fixed object, and specifying a virtual image based on the calculated degree of similarity.

Furthermore, in order to achieve the above-described object, a computer readable recording medium according to an example aspect of the present invention, in an object sensing apparatus including: an emission unit for emitting an RF transmission signal as an electromagnetic wave for object sensing; a reception unit for receiving a reflected wave of the RF transmission signal as an RF reception signal and using the RF transmission signal to generate a demodulated signal based on the RF reception signal; and a processor, includes a program recorded thereon, the program including instructions that cause the processor to carry out:

(a) a step of calculating a range spectrum based on the demodulated signal and detecting a distance from an object that reflected the RF transmission signal to the apparatus based on the calculated range spectrum;

(b) a step of detecting behavior of the object based on the range spectrum;

(c) a step of specifying a fixed object from among detected objects based on the detected distance and behavior; and (d) a step of, if there are two or more objects other than the fixed object among the detected objects, calculating a degree of similarity in change over time in the behavior for each combination of the objects other than the fixed object, and specifying a virtual image based on the calculated degree of similarity.

Advantageous Effects of the Invention

As described above, according to the present invention, in object sensing using radar, it is possible to specify a virtual image generated by an electromagnetic wave reflected by a fixed object without using complicated processing or a special apparatus.

EXAMPLE EMBODIMENT

Summary of the Invention

Figure 1:
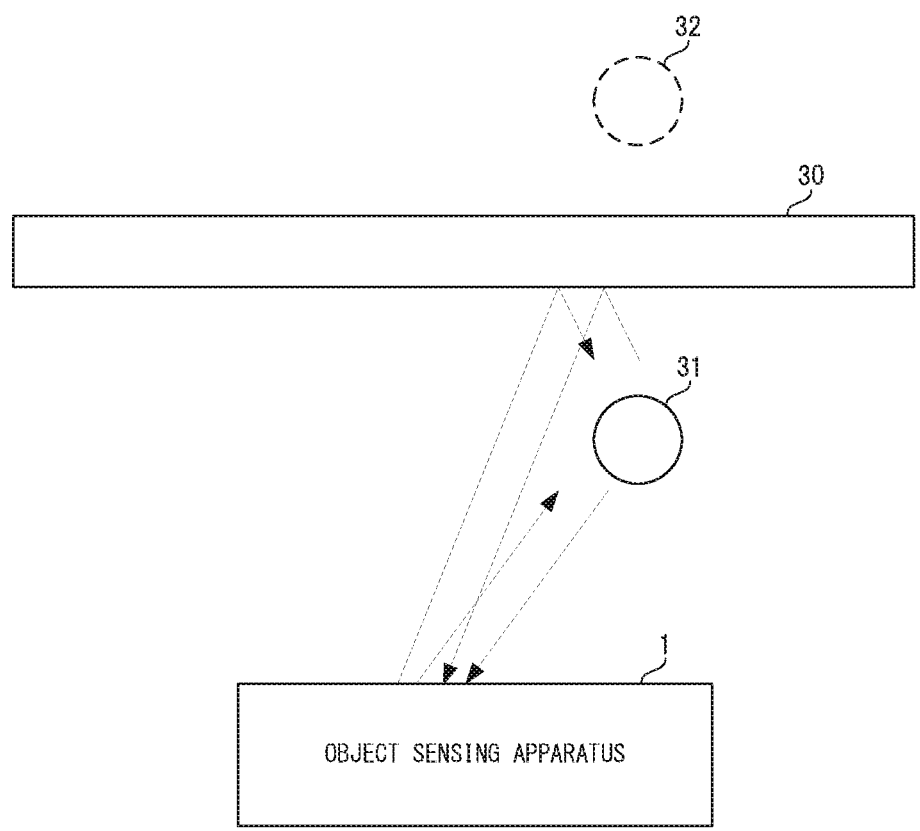
FIG. 1 is a diagram for illustrating a principle of the present invention.

First, a principle of the present invention will be described with reference to FIG. 1. FIG. 1 is a diagram for illustrating a principle of the present invention.

In FIG. 1, the object sensing apparatus 1 is an apparatus that senses an object by emitting an electromagnetic wave (RF transmission signal) and receiving the reflected electromagnetic wave. Also, in FIG. 1, reference numeral 31 indicates a movable object such as a person or an automobile. Reference numeral 30 indicates an object, but is a fixed object that is fixed to the ground, such as a wall.

Also, as shown in FIG. 1, if the object sensing apparatus 1 emits an electromagnetic wave, the electromagnetic wave is reflected by the object 31, and thereafter is received by the object sensing apparatus 1. Accordingly, the object 31 is sensed.

On the other hand, a portion of the electromagnetic wave emitted from the object sensing apparatus 1 is reflected by the fixed object 30 and is further reflected by the object 31 as well, and thereafter, is once again reflected by the fixed object 30 and received by the object sensing apparatus 1.

The path length of the electromagnetic wave received via the fixed object 30 in this manner is longer compared to the path length of the electromagnetic wave that reaches the object 31 directly. As a result, the object sensing apparatus 1 senses the object 31 as an object 32 that is farther away than the fixed object 30. However, the object 32 is a virtual image, and in actuality, no object is present at the position of the distance at which the object 32 was detected.

For this reason, in the present invention, the object sensing apparatus 1 determines whether the object 32 detected farther away than the fixed object 30 is a virtual image or an object that actually exists. That is, the object sensing apparatus 1 first detects the fixed object 30, the object 31, and the object 32. Then, the object sensing apparatus 1 detects the distances and behaviors of the fixed object 30, the object 31, and the object 32, and determines whether or not the fixed object 30 is a fixed object based on the result of the detection.

Next, the object sensing apparatus 1 calculates the degree of similarity in the change over time of the combination of the object 32, which is farther away than the fixed object 30, and the object 31, which is closer than the fixed object 30, and specifies the virtual image based on the calculated degree of similarity. Specifically, the object sensing apparatus 1 calculates a correlation coefficient between the object 31 and the object 32, for example, and if the absolute value of the correlation coefficient exceeds a determined threshold value, the object sensing apparatus 1 determines that the object 31 and the object 32 are the same object, and that the object 32 that is farther away is a virtual image caused by the object 31.

First Example Embodiment

Hereinafter, an object sensing apparatus, an object sensing method, and a program according to a first example embodiment of the present invention will be described with reference to FIGS. 2 to 4.

Apparatus Configuration

First, an overall configuration of an object sensing apparatus according to the first example embodiment will be described with reference to FIG. 2. FIG. 2 is a block diagram showing an overall configuration of the object sensing apparatus according to the first example embodiment of the present invention.

Figure 2:
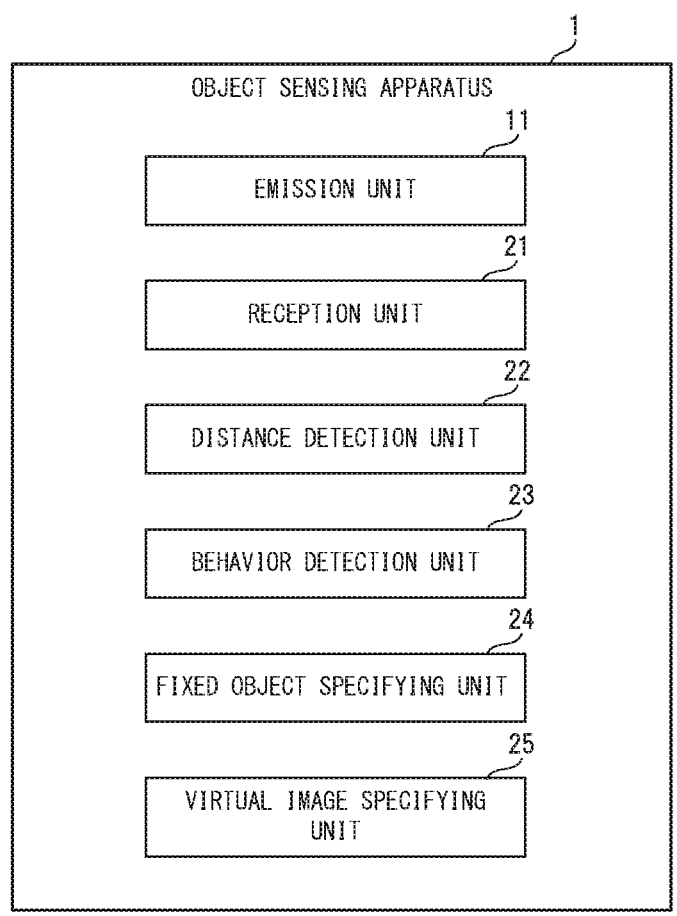
FIG. 2 is a block diagram showing an overall configuration of an object sensing apparatus according to a first example embodiment of the present invention.

As shown in FIG. 2, the object sensing apparatus 1 in the present example embodiment includes: an emission unit 11; a reception unit 21; a distance detection unit 22; a behavior detection unit 23; a fixed object specifying unit 24; and a virtual image specifying unit 25.

The emission unit 11 emits an RF transmission signal as an electromagnetic wave for object sensing. The reception unit 21 receives the reflected wave of the RF transmission signal as an RF reception signal, and uses the RF transmission signal to generate a demodulated signal based on the RF reception signal.

The distance detection unit 22 calculates the range spectrum based on the demodulated signal and detects the object that reflected the RF transmission signal and the distance from the object sensing apparatus 1 to the object based on the calculated range spectrum. The behavior detection unit 23 detects the behavior of the object based on the calculated range spectrum.

The fixed object specifying unit 24 specifies the fixed object from among the detected objects based on the distance detected by the distance detection unit 22 and the behavior detected by the behavior detection unit 23. Note that in the present specification, a "fixed object" means an object such as a wall that is arranged in a fixed manner in the range in which the RF transmission signal is emitted.

First, if two or more objects other than a fixed object (hereinafter written as "moving body") are present among the detected objects, the virtual image specifying unit 25 calculates the degree of similarity in the change over time in the behavior for each combination of moving bodies. Next, the virtual image specifying unit 25 specifies the virtual image based on the calculated degree of similarity. Note that in the present specification, a "virtual image" means an image that is caused by a real object and is detected at a distance different from that of the real object due to reflection of an electromagnetic wave by the fixed object.

In this manner, in the present example embodiment, first, the fixed object is specified, and then the degree of similarity is used to determine whether or not objects other than the fixed object are virtual images. For this reason, in the present example embodiment, there is no need to accurately keep track of the positions and the shapes of the fixed object and the objects other than the fixed object, and thus a high positioning resolution is not required. Accordingly, with the present invention, in object sensing using radar, it is possible to specify a virtual image generated by an electromagnetic wave reflected by a fixed object without using complicated processing or a special apparatus.

Next, a configuration of the object sensing apparatus according to the first example embodiment will be described in detail with reference to FIG. 3. FIG. 3 is a block diagram specifically showing a configuration of an object sensing apparatus according to the first example embodiment of the present invention.

Figure 3:
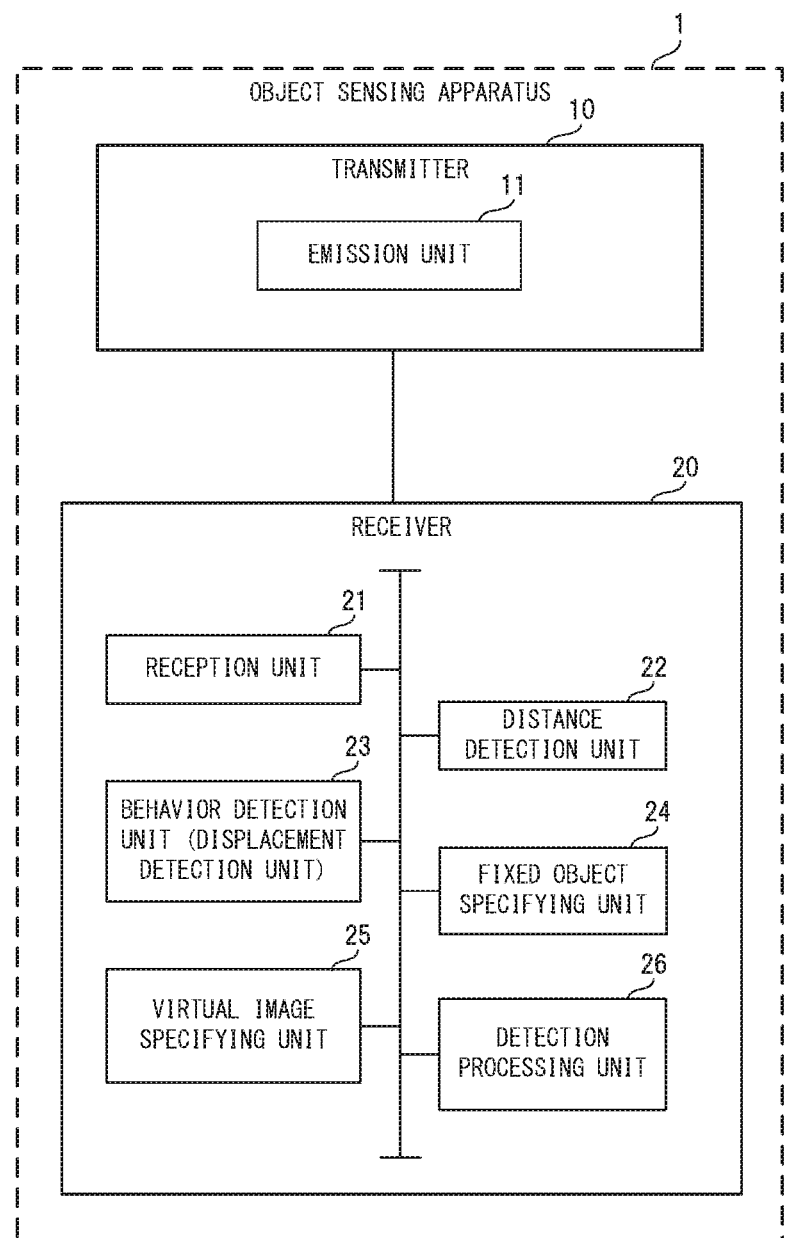
FIG. 3 is a block diagram specifically showing a configuration of an object sensing apparatus according to the first example embodiment of the present invention.

As shown in FIG. 3, in the first example embodiment, the object sensing apparatus 1 includes a transmitter 10 and a receiver 20. Also, as shown in FIG. 3, the transmitter 10 includes the above-described emission unit 11. Furthermore, as shown in FIG. 3, the receiver 20 includes: the reception unit 21, the distance detection unit 22, the behavior detection unit 23, the fixed object specifying unit 24, and the virtual image specifying unit 25, which were mentioned above. The receiver 20 also includes the detection processing unit 26, in addition to these units.

Also, in the first example embodiment, in the object sensing apparatus 1, the emission unit 11 and the reception unit 21 are realized by hardware, and the behavior detection unit 23, the fixed object specifying unit 24, the virtual image specifying unit 25, and the detection processing unit 26 are realized by the software. That is, the behavior detection unit 23, the fixed object specifying unit 24, the virtual image specifying unit 25, and the detection processing unit 26 are constructed by executing a program according to the present example embodiment using the computer.

In the first example embodiment, the emission unit 11 of the transmitter 10 emits the RF transmission signal obtained by performing periodic frequency sweeping as an electromagnetic wave. Also, when the emission unit 11 emits the RF transmission signal, at that timing, the RF transmission signal is input to the receiver 20.

If an object is present in the range in which the electromagnetic wave was emitted by the emission unit 11, the reception unit 21 of the receiver 20 receives the reflected wave reflected by the object as the RF reception signal. Also, the reception unit 21 uses an FMCW scheme and uses the RF transmission signal input from the transmitter 10 to demodulate the RF reception signal and thereby generate a demodulated signal.

First, the distance detection unit 22 executes a Fourier transform on the demodulated signal generated by the reception unit 21 and thereby calculates a range spectrum. Then, the distance detection unit 22 detects the peak position of the range spectrum obtained through the Fourier transform, and uses the detected peak position to detect the distance from the object sensing apparatus 1 to the object.

In the first example embodiment, the behavior detection unit 23 functions as a displacement detection unit for detecting the displacement of the object as the behavior of the object. Specifically, when the peak position of the range spectrum is detected by the distance detection unit 22, the behavior detection unit 23 detects the displacement of the object based on the phase of the range spectrum at the detected peak position. Also, in the first example embodiment, the behavior detection unit 23 can also directly detect the displacement of the object based on the peak position of the range spectrum.

In the first example embodiment, for each detected object, the fixed object specifying unit 24 determines whether or not the object is a fixed object based on the distance to the object detected by the distance detection unit 22, and the displacement of the object detected by the behavior detection unit 23. Specifically, for each object whose distance has been detected, the fixed object specifying unit 24 determines whether or not the displacement is less than or equal to a threshold value. Then, the fixed object specifying unit 24 specifies an object whose displacement is less than or equal to a threshold value as a fixed object.

In the first example embodiment, based on the distances detected for the objects, the virtual image specifying unit 25 first divides the objects other than the fixed object into an object that is farther away than the fixed object and an object that is closer than the fixed object, using the object sensing apparatus 1 as a reference. Next, the virtual image specifying unit 25 sets a combination using the object that is farther away than the fixed object and the object that is closer than the fixed object, and the degree of similarity in the change over time in the behavior is calculated for each set combination. Also, examples of the degree of similarity include a correlation coefficient for the detected displacement. Thereafter, the virtual image specifying unit 25 specifies the virtual image based on the calculated degree of similarity.

The detection processing unit 26 detects an object that actually exists in the space to which the RF transmission signal was emitted by the emission unit 11, and outputs information for specifying the detected object. Specifically, if no fixed object has been specified by the fixed object specifying unit 24, the detection processing unit 26 detects all of the objects whose distances were detected as real objects. On the other hand, if a fixed object has been specified by the fixed object specifying unit 24, the sensing processing unit 26 excludes the object considered to a be virtual image and the fixed object from the objects whose distances have been detected, and detects the remaining object as a real object.

Apparatus Operation

Next, an operation of the object sensing apparatus 1 in the first example embodiment of the present invention will be described with reference to FIG. 4. FIG. 4 is a flowchart showing operations of the object sensing apparatus according to the first example embodiment of the present invention. In the following description, FIGS. 1 to 3 will be referred to as necessary. Also, in the first example embodiment, the object sensing method is implemented by causing the object sensing apparatus 1 to operate. Accordingly, the description of the object sensing method according to the first example embodiment is substituted with the following description of operations of the object sensing apparatus 1. Note that in the first example embodiment, in the following processing flow, the order of the processing may also be switched, as long as suitable processing is performed.

Figure 4:
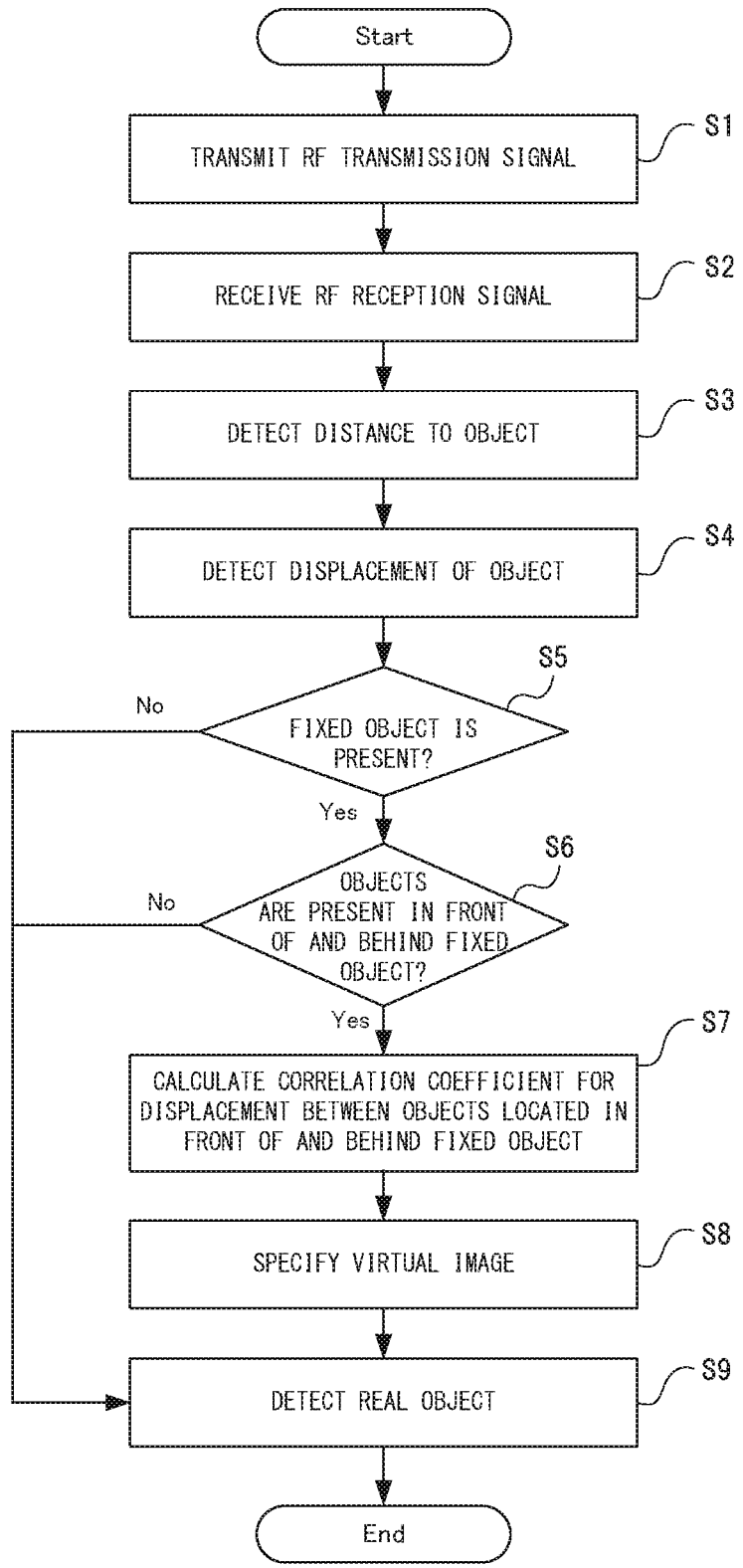
FIG. 4 is a flowchart showing operations of the object sensing apparatus according to the first example embodiment of the present invention.

As shown in FIG. 4, first, in the transmitter 10, the emission unit 11 emits the RF transmission signal obtained by performing periodic frequency sweeping to a pre-set space (step S1). Then, if an object that reflects the RF transmission signal is present in the space, the emitted RF transmission signal is reflected by the object. The reflected signal returns to the object sensing apparatus 1 as an RF reception signal. Also, during emission, the emission unit 11 inputs the RF transmission signal to the receiver 20 as well.

Next, the reception unit 21 receives the signal reflected by the object present in the space, and demodulates the received RF reception signal using the RF transmission signal input from the transmitter 10 to generate the demodulated signal (step S2).

Next, the distance detection unit 22 calculates the range spectrum based on the demodulated signal generated in step S2 and uses the calculated range spectrum to detect the distance from the object sensing apparatus 1 to the object (step S3).

Specifically, in step S3, the distance detection unit 22 calculates the range spectrum by performing a Fourier transform on the demodulated signal, and determines whether or not there is a peak in the range spectrum. If there is a peak in the range spectrum, the peak corresponds to an object, and therefore the distance detection unit 22 detects the presence of the object and the distance to the object based on the position of the peak.

Next, based on the phase of the range spectrum calculated in step S3, the behavior detection unit 23 detects the displacement of the object whose distance was detected (step S4). Specifically, in step S4, the behavior detection unit 23 specifies the phase of the range spectrum at the position of the peak detected in step S3, and detects the displacement of the object based on the specified phase.

Next, based on the distance to the object detected in step S3 and the displacement of the object detected in step S4, the fixed object specifying unit 24 determines whether or not a fixed object is present among the detected objects (step S5).

If it is determined in step S5 that no fixed object is present among the detected objects, later-described step S9 is executed. On the other hand, if it is determined in step S5 that a fixed object is present among the detected objects, later-described step S6 is executed.

In step S6, the virtual image specifying unit 25 determines whether or not an object that is closer than the fixed object and an object that is farther away than the fixed object using the object sensing apparatus 1 as a reference are present among the objects other than the fixed object.

If it is determined in step S6 that an object that is closer than the fixed object and an object that is farther away than the fixed object are not present among the objects other than the fixed object, later-described step S9 is executed. On the other hand, if it is determined in step S6 that an object that is closer than the fixed object and an object that is farther away than the fixed object are present among the objects other than the fixed object, later-described step S7 is executed.

In step S7, the virtual image specifying unit 25 calculates the degree of similarity in the change over time in the displacement for each combination of objects other than the fixed object. Specifically, in step S7, first, based on the distances detected for the objects, the virtual image specifying unit 25 divides the objects other than the fixed object into objects that are farther away than the fixed object and objects that are closer than the fixed object, using the object sensing apparatus 1 as a reference. Next, the virtual image specifying unit 25 sets combinations using objects that are farther away than the fixed object and objects that are closer than the fixed object, and calculates the degree of similarity in the change over time in the behavior for each set combination.

Also, for example, the virtual image specifying unit 25 uses the following equation 1 to calculate, as the degree of similarity, a correlation coefficient for displacement between an object j that is closer than the fixed object and an object k that is farther away than the fixed object with respect to the object sensing apparatus 1. Note that in the following equation 1, $d_j(t_i)$ and $d_k(t_i)$ indicate the displacements of the object j and the object k at a time $t_i$.

Equation 1

$$\rho_{jk}^d = \frac{\sum_{i=0}^{I-1}\left\{d_j(t_i) - \frac{1}{I}\sum_{i=0}^{I-1}d_j(t_i)\right\}\left\{d_k(t_i) - \frac{1}{I}\sum_{i=0}^{I-1}d_k(t_i)\right\}}{\sqrt{\left[\sum_{i=0}^{I-1}\left\{d_j(t_i) - \frac{1}{I}\sum_{i=0}^{I-1}d_j(t_i)\right\}^2\right]\left[\sum_{i=0}^{I-1}\left\{d_k(t_i) - \frac{1}{I}\sum_{i=0}^{I-1}d_k(t_i)\right\}^2\right]}}$$

Next, based on the degree of similarity calculated in step S7, the virtual image specifying unit 25 selects a combination of a real object and its virtual image among all combinations of objects that are closer than the fixed object and objects that are farther away than the fixed object, and specifies the virtual image (step S8).

Specifically, in step S8, for example, the virtual image specifying unit 25 lines up the combinations according to the size of the absolute value of the correlation coefficient and selects all of the combinations for which the correlation coefficient exceeds a threshold value Th. However, if any object included in a combination is included in another combination that has already been selected, that combination is not selected. Then, the virtual image specifying unit 25 determines that the object that is farther away than the fixed object is the virtual image in the selected combination. Note that the threshold value Th is set as appropriate by performing an experiment or the like in advance.

Next, based on the results of the steps, the detection processing unit 26 detects an object that actually exists in a space to which the RF transmission signal was emitted by the emission unit 11 and outputs information for specifying the detected object (step S9).

Specifically, if no fixed object has been specified by the fixed object specifying unit 24 (No in step S5), the sensing processing unit 26 detects all of the objects whose distances were detected, as real objects. On the other hand, if a fixed object has been specified by the fixed object specifying unit 24 and the result of step S6 is "No", the sensing processing unit 26 detects the objects other than the fixed object. Also, if step S7 has been executed, the sensing processing unit 26 excludes the object considered to be a virtual image and the fixed object from the objects whose distances have been detected, and determines the remaining objects as real objects.

As described above, in the first example embodiment, the object sensing apparatus 1 can specify a virtual image that appears due to a fixed object and remove the specified virtual image from the object sensing result, and in this case, there is no need to increase the positioning resolution. Accordingly, with the first example embodiment, it is possible to specify a virtual image generated by an electromagnetic wave reflected by a fixed object, without using complicated processing or a special apparatus.

Program

The program according to the first example embodiment need only be a program for causing a computer to execute steps S3 to S9 shown in FIG. 4. By installing the program on a computer and executing the program, it is possible to realize the object sensing apparatus 1 and the object sensing method of the first example embodiment. In this case, the CPU (Central Processing Unit) of the computer functions as the behavior detection unit 23, the fixed object specifying unit 24, the virtual image specifying unit 25, and the detection processing unit 26, and performs processing.

Also, the program of the first example embodiment may also be executed by a computer system constructed by multiple computers. In this case, for example, the computers may also each function as one of the behavior detection unit 23, the fixed object specifying unit 24, the virtual image specifying unit 25, and the detection processing unit 26. Note that as described above, in the first example embodiment, the emission unit 11 and the reception unit 21 are constructed by dedicated hardware.

Second Example Embodiment

Next, an object sensing apparatus, an object sensing method, and a program according to a second example embodiment of the present invention will be described with reference to FIGS. 5 and 6.

Apparatus Configuration

First, a configuration of an object sensing apparatus according to the second example embodiment will be described with reference to FIG. 5. FIG. 5 is a block diagram specifically showing a configuration of an object sensing apparatus according to the second example embodiment of the present invention.

Figure 5:
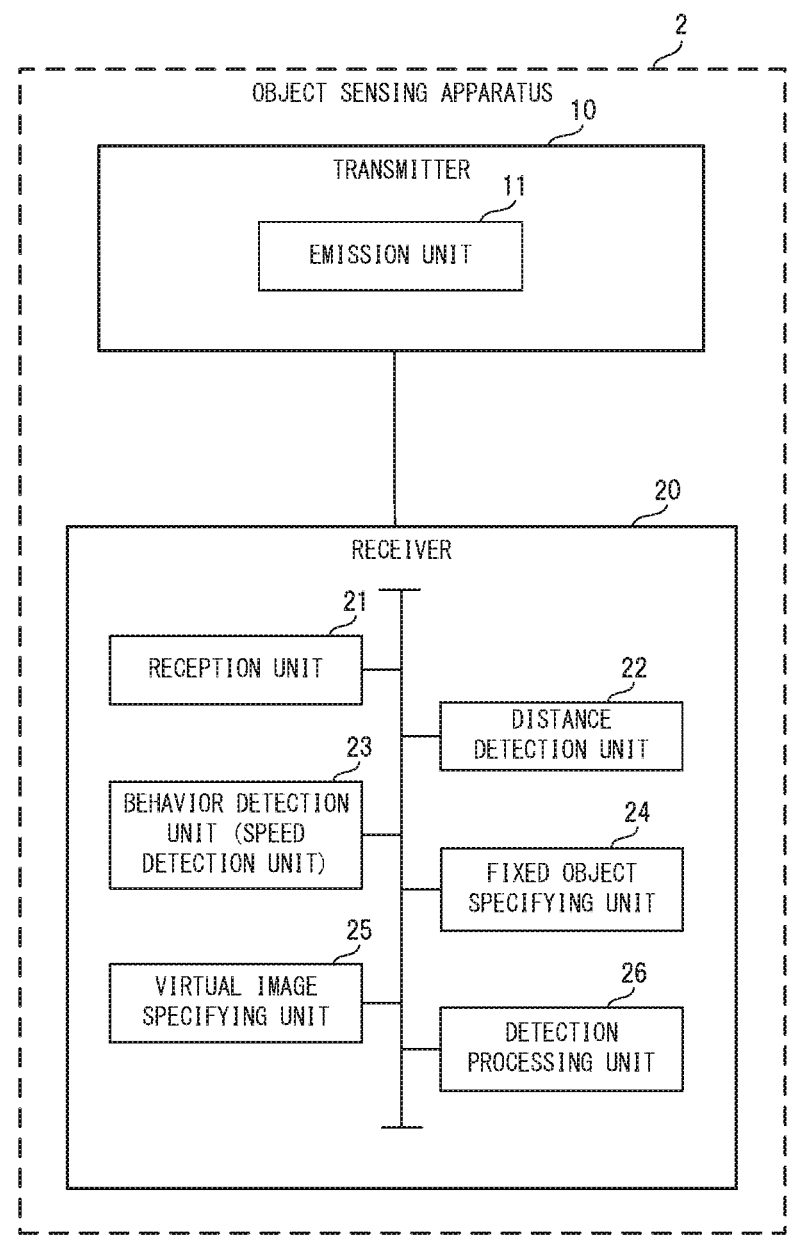
FIG. 5 is a block diagram specifically showing a configuration of an object sensing apparatus according to a second example embodiment of the present invention.

As shown in FIG. 5, similarly to the object sensing apparatus 1 of the first example embodiment, an image sensing apparatus 2 of the second example embodiment also includes: an emission unit 11, a reception unit 21, a distance detection unit 22, a behavior detection unit 23, a fixed object specifying unit 24, a virtual image specifying unit 25, and a detection processing unit 26. However, in the second example embodiment, the object sensing apparatus 2 differs from the object sensing apparatus 1 of the first example embodiment with regard to the function of the behavior detection unit 23. Hereinafter, points of difference will mainly be described.

In the second example embodiment, the behavior detection unit 23 detects the movement speed of the object as the behavior, based on the Doppler frequency at the peak position of the range spectrum. That is, in the second example embodiment, the behavior detection unit 23 functions as a speed detection unit that detects the movement speed of the object.

Also, for this reason, in the second example embodiment, the fixed object specifying unit 24 specifies the fixed object from among the detected objects based on the distance to the object detected by the distance detection unit 22 and the movement speed of the object detected by the behavior detection unit 23.

Furthermore, in the second example embodiment, for each set combination of objects, the virtual image specifying unit 25 calculates the degree of similarity in the change over time in the speed of the object as the degree of similarity in the change over time in the behavior, and specifies the virtual image based on the calculated degree of similarity.

Apparatus Operation

Next, an operation of the object sensing apparatus 2 in the second example embodiment of the present invention will be described with reference to FIG. 6. FIG. 6 is a flowchart showing operations of the object sensing apparatus according to the second example embodiment of the present invention. In the following description, FIG. 5 will be referred to as necessary. Also, in the second example embodiment, the object sensing method is implemented by causing the object sensing apparatus 2 to operate. Accordingly, the description of the object sensing method according to the second example embodiment is substituted with the following description of operations of the object sensing apparatus 2. Note that in the second example embodiment, in the following processing flow, the order of the processing may also be switched, as long as suitable processing is performed.

Figure 6:
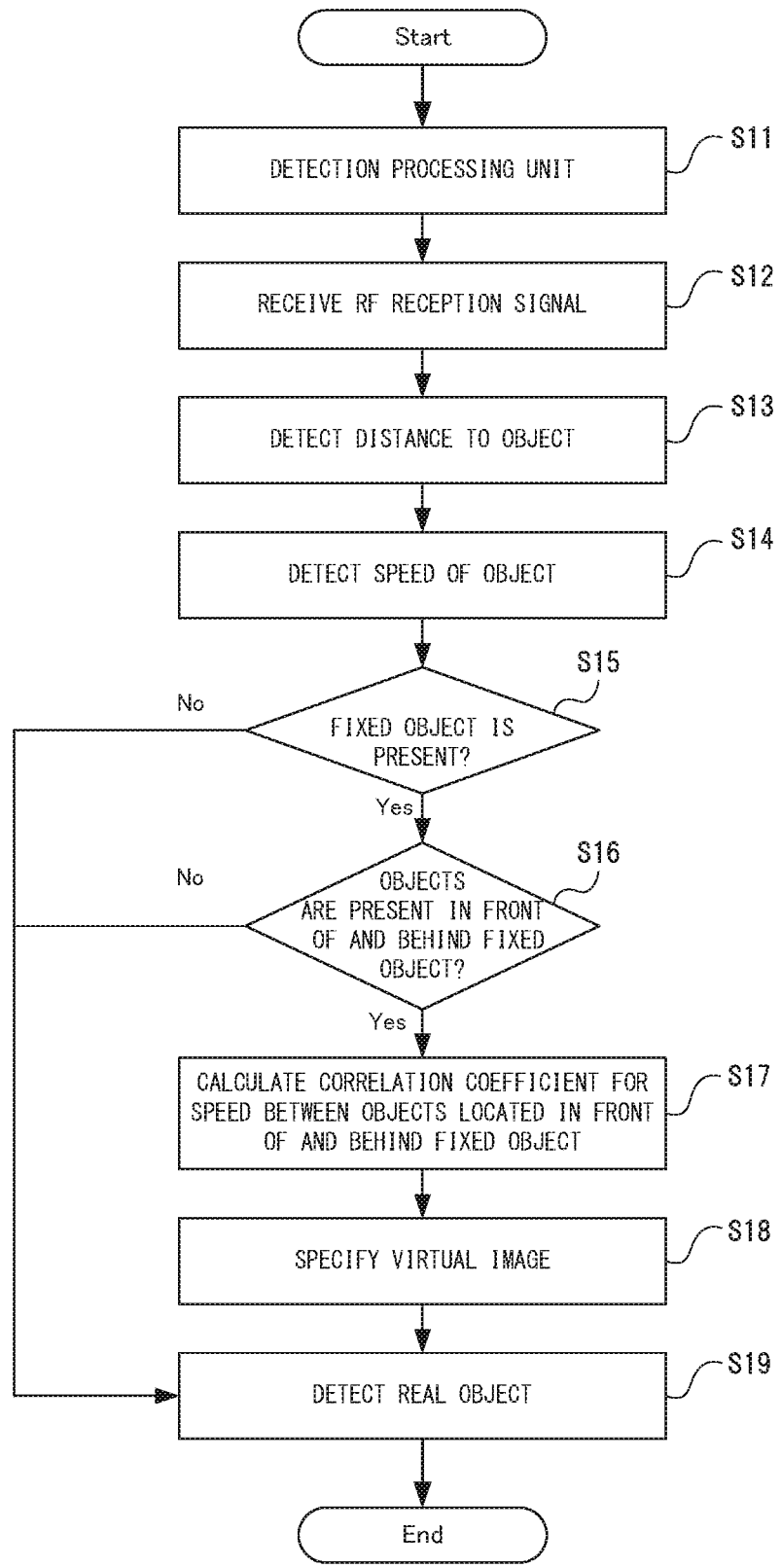
FIG. 6 is a flowchart showing operations of the object sensing apparatus according to the second example embodiment of the present invention.

As shown in FIG. 6, first, in the transmitter 10, the emission unit 11 emits the RF transmission signal obtained by performing periodic frequency sweeping to a pre-set space (step S11). Step S11 is a step that is similar to step S1 shown in FIG. 4.

Next, the reception unit 21 receives the signal reflected by the object present in the space as an RF reception signal, and demodulates the received RF reception signal using the RF transmission signal input from the transmitter 10 to generate the demodulated signal (step S12). Step S12 is a step that is similar to step S2 shown in FIG. 4.

Next, the distance detection unit 22 calculates the range spectrum based on the demodulated signal generated in step S2 and uses the calculated range spectrum to detect the distance from the object sensing apparatus 1 to the object (step S13). Step S13 is a step that is similar to step S3 shown in FIG. 4.

Next, based on the Doppler frequency at the peak position of the range spectrum calculated in step S13, the behavior detection unit 23 detects the movement speed of the object (step S14).

Next, the fixed object specifying unit 24 determines whether or not a fixed object is present among the detected objects, based on the distances to the objects detected in step S13 and the movement speeds of the objects detected in step S14 (step S15).

If it is determined in step S15 that no fixed object is present among the detected objects, later-described step S19 is executed. On the other hand, if it is determined in step S15 that a fixed object is present among the detected objects, later-described step S16 is executed.

In step S16, the virtual image specifying unit 25 determines whether or not an object that is closer than the fixed object and an object that is farther away than the fixed object using the object sensing apparatus 1 as a reference are present among the objects other than the fixed object. Step S16 is a step that is similar to step S6 shown in FIG. 4.

If it is determined in step S16 that an object that is closer than the fixed object and an object that is farther away than the fixed object are not present among the objects other than the fixed object, later-described step S19 is executed. On the other hand, if it is determined in step S16 that an object that is closer than the fixed object and an object that is farther away than the fixed object are present among the objects other than the fixed object, later-described step S17 is executed.

In step S17, for each combination of objects other than the fixed object, the virtual image specifying unit 25 calculates the degree of similarity in the change over time in the speed. Specifically, in step S17, first, based on the distances detected for the objects, the virtual image specifying unit 25 divides the objects other than the fixed object into objects that are farther away than the fixed object and objects that are closer than the fixed object, using the object sensing apparatus 1 as a reference. Next, the virtual image specifying unit 25 sets combinations using the objects that are farther away than the fixed object and the objects that are closer than the fixed object, and the degree of similarity in the change over time in the speed is calculated for each set combination.

Also, for example, the virtual image specifying unit 25 uses the following equation 2 to calculate, as the degree of similarity, a correlation coefficient for speed between an object j that is closer than the fixed object and an object k that is farther away than the fixed object with respect to the object sensing apparatus 1. Note that in the following equation 2, $v_j(t_i)$ and $v_k(t_i)$ indicate the movement speed of the object j and the object k at the time $t_i$.

Equation 2

$$\rho_{jk}^v = \frac{\sum_{i=0}^{I-1}\left\{v_j(t_i) - \frac{1}{I}\sum_{i=0}^{I-1} v_j(t_i)\right\}\left\{v_k(t_i) - \frac{1}{I}\sum_{i=0}^{I-1} v_k(t_i)\right\}}{\sqrt{\left[\sum_{i=0}^{I-1}\left\{v_j(t_i) - \frac{1}{I}\sum_{i=0}^{I-1} v_j(t_i)\right\}^2\right]\left[\sum_{i=0}^{I-1}\left\{v_k(t_i) - \frac{1}{I}\sum_{i=0}^{I-1} v_k(t_i)\right\}^2\right]}}$$

Next, based on the degree of similarity calculated in step S17, the virtual image specifying unit 25 selects the combination of the real object and its virtual image among all combinations of objects that are closer than the fixed object and objects that are farther away than the fixed object, and specifies the virtual image (step S18). Step S18 is a step that is similar to step S8 shown in FIG. 4.

Next, based on the results of the steps, the detection processing unit 26 detects an object that actually exists in the space to which the RF transmission signal was emitted by the emission unit 11, and outputs information for specifying the detected object (step S19). Step S19 is a step that is similar to step S9 shown in FIG. 4.

As described above, in the second example embodiment as well, the object sensing apparatus 2 can specify a virtual image that appears due to a fixed object, and remove the specified virtual image from the object sensing result, and in this case, there is no need to increase the metering resolution. That is, with the second example embodiment as well, it is possible to specify a virtual object generated by an electromagnetic wave reflected by a fixed object, without using complicated processing or a special apparatus.

Program

The program according to the second example embodiment need only be a program for causing a computer to execute steps S13 to S19 shown in FIG. 6. By installing the program on a computer and executing the program, it is possible to realize the object sensing apparatus 2 and the object sensing method of the second example embodiment. In this case, the CPU (Central Processing Unit) of the computer functions as the behavior detection unit 23, the fixed object specifying unit 24, the virtual image specifying unit 25, and the detection processing unit 26, and performs processing.

Also, the program of the second example embodiment may also be executed by a computer system constructed by multiple computers. In this case, for example, the computers may also each function as one of the behavior detection unit 23, the fixed object specifying unit 24, the virtual image specifying unit 25, and the detection processing unit 26. Note that in the second example embodiment as well, similarly to the first example embodiment, the emission unit 11 and the reception unit 21 are constructed by dedicated hardware.

Third Example Embodiment

Next, an object sensing apparatus, an object sensing method, and a program according to a third example embodiment of the present invention will be described with reference to FIGS. 7 to 9.

Apparatus Configuration

First, a configuration of an object sensing apparatus according to the third example embodiment will be described with reference to FIG. 7. FIG. 7 is a block diagram specifically showing a configuration of an object sensing apparatus according to the third example embodiment of the present invention.

Figure 7:
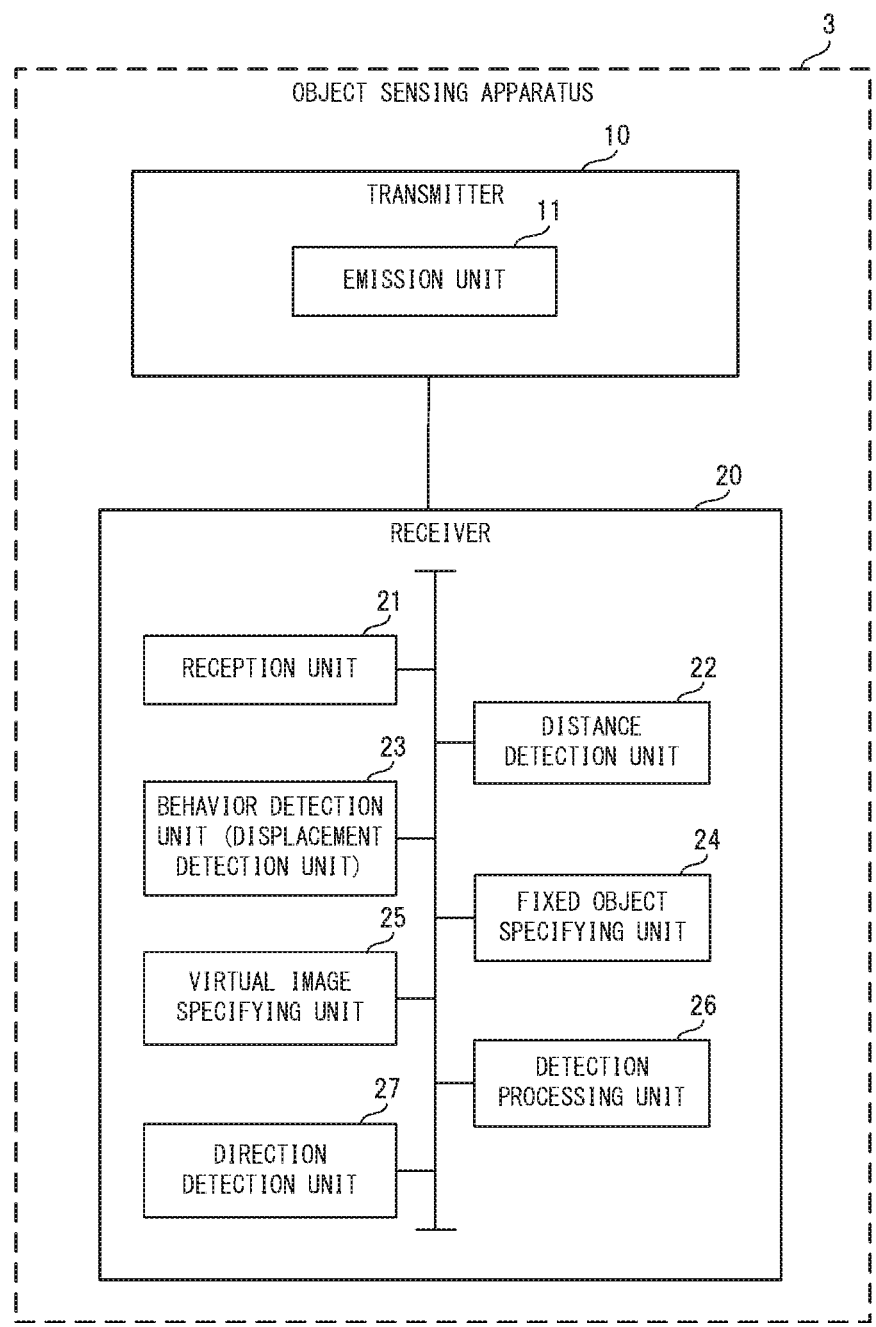
FIG. 7 is a block diagram specifically showing a configuration of an object sensing apparatus according to a third example embodiment of the present invention.

As shown in FIG. 7, similarly to the object sensing apparatus 1 of the first example embodiment, an image sensing apparatus 3 of the third example embodiment also includes: an emission unit 11, a reception unit 21, a distance detection unit 22, a behavior detection unit 23, a fixed object specifying unit 24, a virtual image specifying unit 25, and a detection processing unit 26. However, in the third example embodiment, the object sensing apparatus 2 also further includes a direction detection unit 27, and thus differs from the object sensing apparatus 1 of the first example embodiment in this respect. Hereinafter, points of difference will mainly be described.

First, in the third example embodiment, the reception unit 21 includes two or more reception antennas. The RF reception signal is received by the reception unit 21 and the reception antennas, and in each reception antenna, the received RF reception signal is demodulated according to the RF transmission signal, and a demodulated signal is generated.

The direction detection unit 27 detects the direction of the object based on the demodulated signal generated by each antenna. Specifically, for example, the direction detection unit 27 can specify the intensities of the demodulated signals and calculate the direction of the object based on the specified intensities and the positions of the antennas. The direction detection unit 27 can also specify the phases of the demodulated signals and calculate the direction of the object based on the specified phases and the positions of the antennas. Note that the direction of the object is calculated using the position of the object sensing apparatus 3 as a reference.

Also, upon detecting the direction of the object, the direction detection unit 27 sets a weight for each antenna in correspondence with the detected direction. Then, the direction detection unit 27 uses the weights set for the antennas to composite the demodulated signals of each antenna and calculate a weighted sum signal. Then, in the third example embodiment, the distance detection unit 22 calculates the range spectrum by subjecting the weighted sum signal to a Fourier transform, and detects the distance from the object sensing apparatus 1 to the object.

In the third example embodiment, the virtual image specifying unit 25 sets combinations using objects that are farther away than the fixed object and objects that are closer than the fixed object. However, in the third example embodiment, based on the detected direction, the virtual image specifying unit 25 selects a combination estimated to be the combination of the actual image and its virtual image from among the set combinations and calculates the degree of similarity in the change over time of the behavior for the selected combination.

Here, processing performed by the virtual image specifying unit 25 will be described with reference to FIG. 8. FIG. 8 is a diagram for illustrating processing of the third example embodiment of the present invention.

Figure 8:
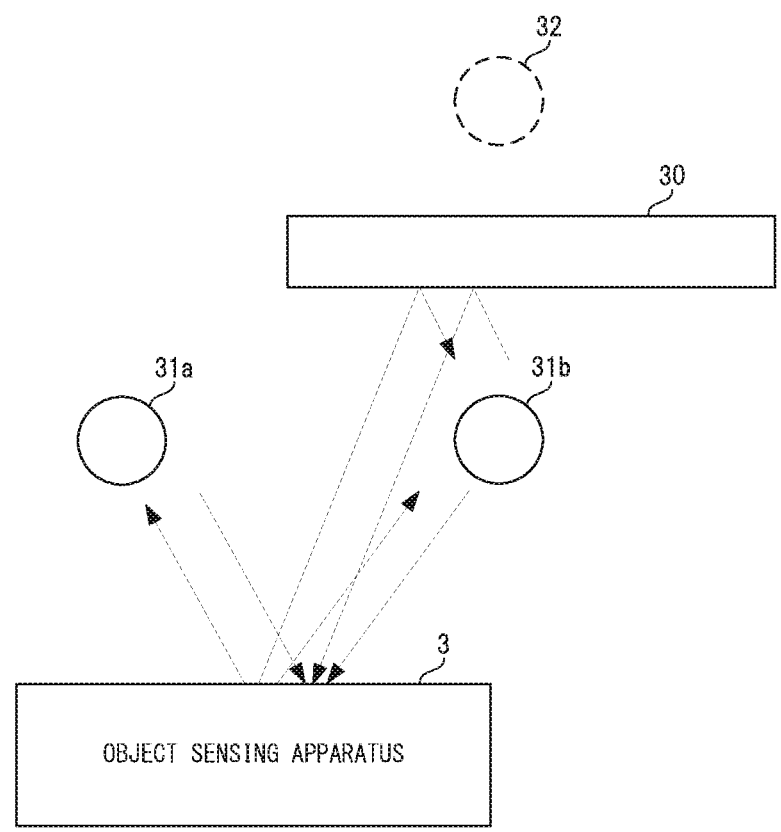
FIG. 8 is a diagram for illustrating processing according to the third example embodiment of the present invention.

In the example shown in FIG. 8, in a view from the object sensing apparatus 3, the fixed object 30 is present behind an object 31b, but no object 30 is present behind an object 31a.

Accordingly, the object 32 is detected as a virtual image for the object 31b, and no virtual image is detected for the object 31a.

In this kind of state, in the first example embodiment, the virtual image specifying unit 25 calculates the degree of similarity for all combinations of objects that are arranged in front of and behind the fixed object 30, that is, for the combination of the object 31a and the object 32 and the combination of the object 31b and the object 32.

In contrast to this, in the third example embodiment, the directions of the objects are detected, and therefore the virtual image specifying unit 25 can, based on the positional relationship, exclude combinations that cannot be a combination of an actual image and its virtual image, that is, the combination of the object 31a and the object 32, from the targets for calculating the degree of similarity. Then, the virtual image specifying unit 25 selects only the combination of the object 31b and the object 32, calculates the degree of similarity in the change over time for that combination, and determines whether or not the object 32 is a virtual image.

Apparatus Operation

Next, an operation of the object sensing apparatus 3 in the third example embodiment of the present invention will be described with reference to FIG. 9. FIG. 9 is a flowchart showing operations of the object sensing apparatus according to the third example embodiment of the present invention. In the following description, FIGS. 7 and 8 will be referred to as necessary. Also, in the third example embodiment, the object sensing method is implemented by causing the object sensing apparatus 3 to operate. Accordingly, the description of the object sensing method according to the third example embodiment is substituted with the following description of operations of the object sensing apparatus 3. Note that in the third example embodiment, in the following processing flow, the order of the processing may also be switched, as long as suitable processing is performed.

Figure 9:
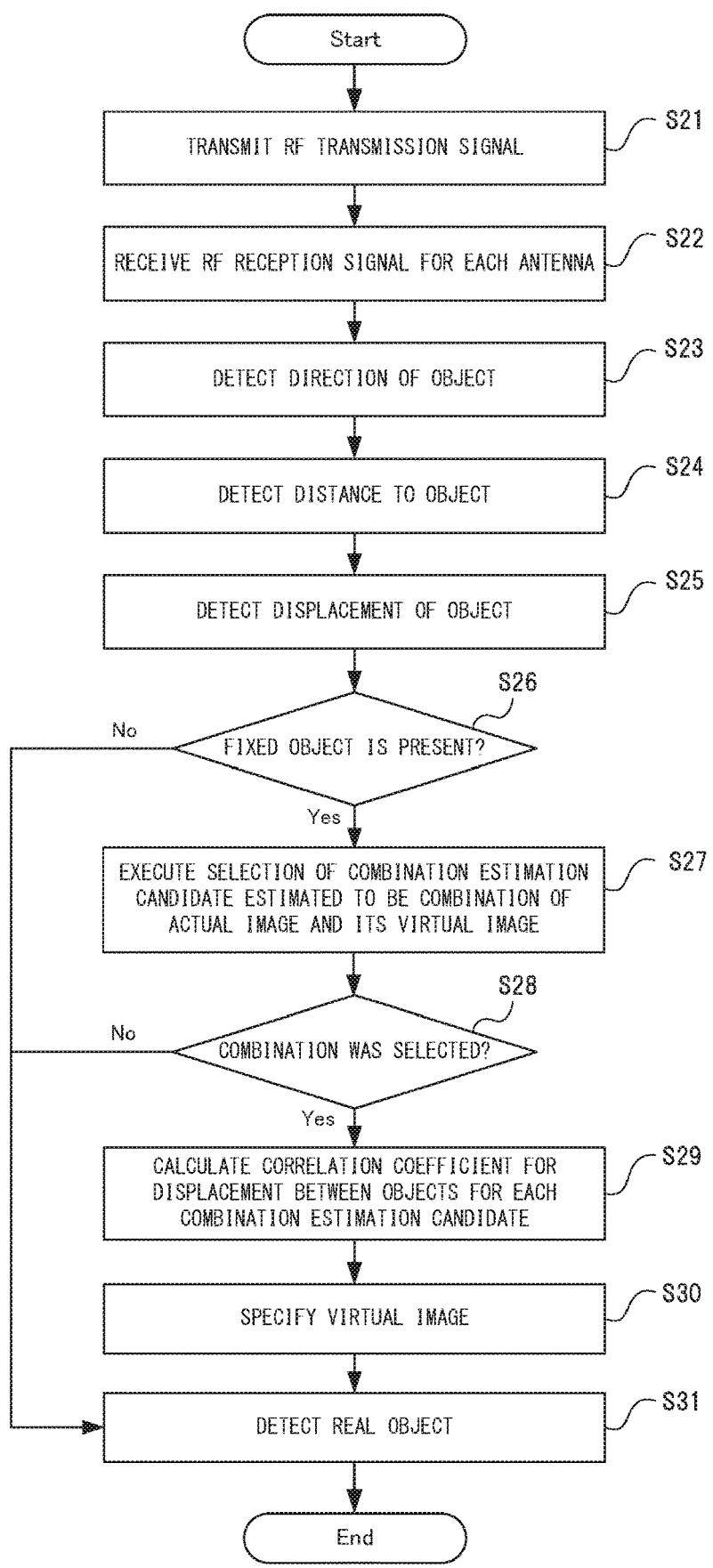
FIG. 9 is a flowchart showing operations of the object sensing apparatus according to the third example embodiment of the present invention.

As shown in FIG. 9, first, in the transmitter 10, the emission unit 11 emits the RF transmission signal obtained by performing periodic frequency sweeping to a pre-set space (step S21). Step S21 is a step that is similar to step S1 shown in FIG. 4.

Next, the reception unit 21 receives a signal reflected by an object present in the space with the antennas as the RF reception signal, and in each antenna, the received RF reception signal is demodulated using the RF transmission signal input from the transmitter 10 to generate a demodulated signal (step S22).

Next, the direction detection unit 27 detects the direction of the object based on the demodulated signal generated by each antenna (step S23). Specifically, in step S23, the direction detection unit 27 specifies the intensities of the demodulated signals and calculates the directions of the objects based on the specified intensities and the positions of the antennas. Also, in step S23, the position detection unit 27 can also specify the phases of the demodulated signals and calculate the directions of the objects based on the specified phases and the positions of the antennas.

Also, in step S23, upon detecting the positions of the objects, the position detection unit 27 sets weights for the antennas in correspondence with the detected directions. Then, the direction detection unit 27 uses the weights set for the antennas to composite the demodulated signals of each antenna and calculate a weighted sum signal.

Next, the distance detection unit 22 calculates the range spectrum based on the demodulated signals generated in step S2 and uses the calculated range spectrum to detect the distance from the object sensing apparatus 1 to the object (step S24).

Specifically, in step S24, the distance detection unit 22 calculates the range spectrum by performing a Fourier transform on the weighted sum signal calculated in step S23, and determines whether or not a peak is present in the range spectrum. If there is a peak in the range spectrum, the peak corresponds to an object, and therefore the distance detection unit 22 detects the presence of the object and the distance to the object based on the position of the peak.

Next, based on the phase of the range spectrum calculated in step S24, the behavior detection unit 23 detects the displacement of the object whose distance was detected (step S25). Step S25 is a step that is similar to step S4 shown in FIG. 4.

Next, the fixed object specifying unit 24 determines whether or not a fixed object is present among the detected objects, based on the distances to the objects detected in step S24 and the displacement of the objects detected in step S25 (step S26). Step S26 is a step that is similar to step S5 shown in FIG. 4.

If it is determined in step S26 that no fixed object is present among the detected objects, later-described step S31 is executed. On the other hand, if it is determined in step S26 that a fixed object is present among the detected objects, step S27 is executed.

In step S27, based on the directions detected in step S23, the virtual image specifying unit 25 executes selection of a combination estimated to be a combination of an actual image and a virtual image from among combinations of objects that are farther away than the fixed object and objects that are closer than the fixed object.

Specifically, in step S27, first, based on the distances detected for the objects, the virtual image specifying unit 25 divides the objects other than the fixed object into objects that are farther away than the fixed object and objects that are closer than the fixed object, using the object sensing apparatus 1 as a reference. Next, the virtual image specifying unit 25 sets combinations using objects that are farther away than the fixed object and objects that are closer than the fixed object.

Furthermore, the virtual image specifying unit 25 calculates a transmission path of an electromagnetic wave using a ray trace method, for example, based on the directions extracted in step S23, the distances extracted in step S24, and information such as the position of the fixed object specified in step S26. Then, based on the calculated transmission path, the virtual image specifying unit 25 selects the combination estimated to be the combination of the actual image and its virtual image (hereinafter described as "combination estimation candidate") from among the set combinations.

Next, the virtual image specifying unit 25 determines whether or not the estimated combination candidate was selected (step S28). If it is determined in step S28 that no estimated combination candidate was selected, later-described step S31 is executed.

On the other hand, if it is determined in step S28 that an estimated combination candidate was selected, the virtual image specifying unit 25 calculates the degree of similarity in the change over time in the displacement for each selected estimated combination candidate (step S29). Note that similarly to step S7 shown in FIG. 4, the calculation of the degree of similarity in step S29 is performed using equation 1 above.

Next, based on the degree of similarity calculated in step S29, the virtual image specifying unit 25 selects the combination of the real object and its virtual image among all estimated combination candidates, and specifies the virtual image (step S30). Specifically, in step S30 as well, similarly to step S8 shown in FIG. 4, the virtual image specifying unit 25 selects all of the combinations for which the correlation coefficient exceeds a threshold value Th, for example. Then, the virtual image specifying unit 25 determines that the object that is farther away than the fixed object is the virtual image in the selected combinations.

Next, based on the results of the steps, the detection processing unit 26 detects an object that actually exists in the space to which the RF transmission signal was emitted by the emission unit 11, and outputs information for specifying the detected object (step S31). Step S31 is a step that is similar to step S9 shown in FIG. 4.

As described above, in the third example embodiment, since the degree of similarity is not calculated for a combination that cannot be a combination of a real image and its virtual image, the calculation amount can be reduced compared to the first and second example embodiments, and therefore it is possible to achieve an improvement in processing speed. Also, in the third example embodiment as well, a virtual image that appears due to a fixed object can be specified and the specified virtual image can be removed from the object sensing result, and therefore it is possible to obtain the effects stated in the first and second example embodiments.

Program

The program according to the third example embodiment need only be a program for causing a computer to execute steps S23 to S31 shown in FIG. 9. By installing the program on a computer and executing the program, it is possible to realize the object sensing apparatus 3 and the object sensing method of the third example embodiment. In this case, the CPU (Central Processing Unit) of the computer functions as the behavior detection unit 23, the fixed object specifying unit 24, the virtual image specifying unit 25, and the detection processing unit 26, and the direction detection unit 27, and performs processing.

Also, the program of the third example embodiment may also be executed by a computer system constructed by multiple computers. In this case, for example, the computers may also each function as one of the behavior detection unit 23, the fixed object specifying unit 24, the virtual image specifying unit 25, the detection processing unit 26, and the direction detection unit 27. Note that in the third example embodiment as well, similarly to the first example embodiment, the emission unit 11 and the reception unit 21 are constructed by dedicated hardware.

Variations

In the above-described example, multiple reception antennas are provided in the reception unit 21, and the direction is calculated by using the signals received by the reception antennas, but the third example embodiment is not limited to this example. In the present example embodiment, the emission unit 21 may also include multiple transmission antennas.

In this form, for each transmission antenna, the emission unit 21 adds an identifier for specifying the transmission antenna to the RF transmission signal emitted from the transmission antenna. Also, in this case, the reception unit 21 extracts the identifier added to the received RF reception signal. Furthermore, the direction detection unit 27 detects the directions of the objects based on the extracted identifiers.

Also, in the above-described example, the behavior detection unit 23 detects the displacement as the behavior, but similarly to the second example embodiment, the behavior detection unit 23 may also detect the movement speeds as the behavior. In this case, the virtual image specifying unit 25 executes the determination of the virtual image using the degree of similarity in the change over time in the movement speed.

Note that in the above-described first to third example embodiments, a correlation coefficient is used as an evaluation index of the degree of similarity for the change over time in the displacement or movement speed, but the first to third example embodiments are not limited to this form. In the first to third example embodiments, the evaluation of the degree of similarity using the distance may also be performed by expressing the chronological data of the displacement or movement speeds of the objects using vectors and further defining the distances between the vectors. Examples of the distances include Euclidean distances.

Physical Configuration

Figure 10:
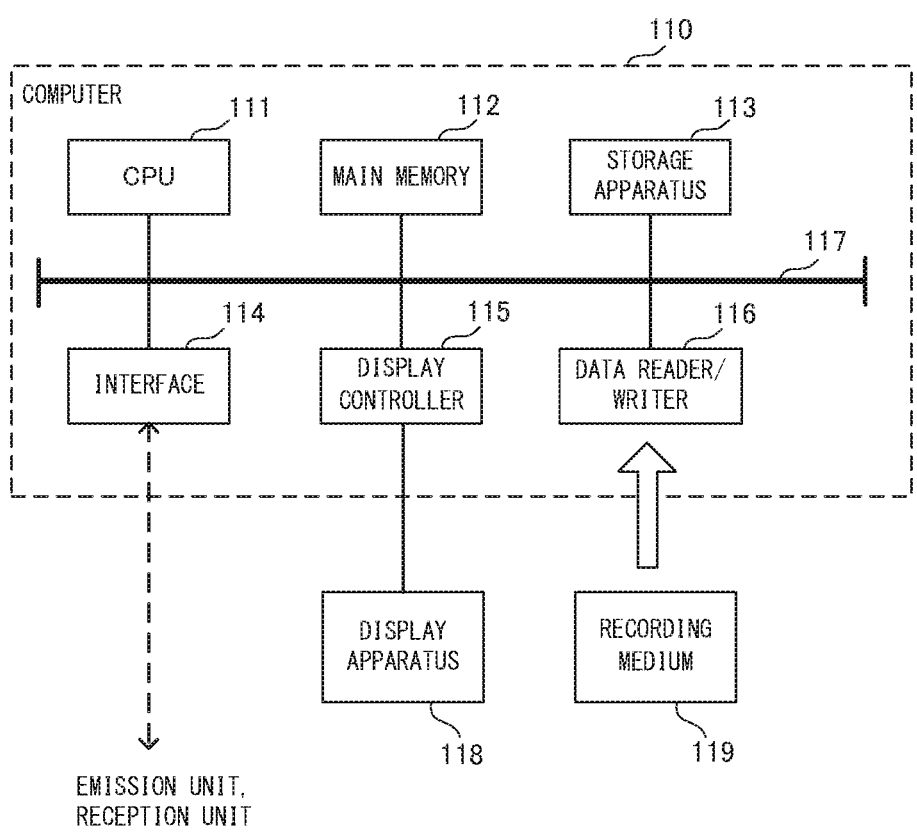
FIG. 10 is a block diagram showing an example of a computer for realizing an object sensing apparatus in the first to third example embodiments of the present invention.

Here, a computer for executing the program according to the first to third example embodiments will be described with reference to FIG. 10. FIG. 10 is a block diagram showing an example of a computer for realizing an object sensing apparatus according to the first to third example embodiments of the present invention.

As shown in FIG. 10, a computer 110 includes: a CPU 111; a main memory 112; a storage apparatus 113; an interface 114; a display controller 115; and a data reader/writer 116. These units are connected via a bus 121 so as to be able to mutually perform data communication.

The CPU 111 deploys the programs (codes) of the present example embodiment, which are stored in the storage apparatus 113, to the main memory 112, and executes them in a predetermined order to carry out various types of computation. The main memory 112 is typically a volatile storage apparatus such as a DRAM (Dynamic Random Access Memory). Also, the programs according to the first to third example embodiments are provided stored in a computer readable recording medium 119. Also, the programs according to the first to third example embodiments may also be distributed on the Internet.

Also, specific examples of the storage apparatus 113 include a hard disk drive, as well as a semiconductor storage apparatus such as a flash memory. The input interface 114 mediates data transfer between the CPU 111 and various types of hardware such as the emission unit 11 and the reception unit 21. The display controller 115 is connected to the display apparatus 118 and controls display on the display apparatus 118.

The data reader/writer 116 mediates data transfer between the CPU 111 and the recording medium 119 and executes readout of programs from the recording medium 119 and writing of the processing results obtained by the computer 110 in the recording medium 119.

Also, specific examples of the recording medium 119 include: a general-purpose semiconductor storage device such as a CF (Compact Flash (registered trademark)) and an SD (Secure Digital); a magnetic recording medium such as a flexible disk; or an optical recording medium such as a CD-ROM (Compact Disk Read Only Memory).

Note that the portions other than the emission unit 11 and the reception unit 21 of the object sensing apparatus according to the first to third example embodiments can also be realized by using hardware, instead of using a computer in which programs are installed. Furthermore, some of the portions other than the emission unit 11 and the reception unit 21 of the object sensing apparatus may also be realized by a program, and the remaining portion may be realized using hardware.

Some or all of the above-described example embodiments can be realized according to Supplementary Note 1 to Supplementary Note 21, which are described hereinafter, but the present invention is not limited to the following description.

Supplementary Note 1

An object sensing apparatus including:

an emission unit configured to emit an RF transmission signal as an electromagnetic wave for object sensing;

a reception unit configured to receive a reflected wave of the RF transmission signal as an RF reception signal, and use the RF transmission signal to generate a demodulated signal based on the RF reception signal;

a distance detection unit configured to calculate a range spectrum based on the demodulated signal, and detect an object that reflected the RF transmission signal and a distance from the apparatus to the object based on the calculated range spectrum;

a behavior detection unit configured to detect behavior of the object based on the range spectrum;

a fixed object specifying unit configured to specify a fixed object from among the detected objects based on the detected distance and behavior; and a virtual image specifying unit configured to, if there are two or more objects other than the fixed object among the detected objects, calculate a degree of similarity in change over time in the behavior for each combination of the objects other than the fixed object, and specify a virtual image based on the calculated degree of similarity.

Supplementary Note 2

The object sensing apparatus according to Supplementary Note 1, wherein based on the distances calculated for the objects, the virtual image specifying unit divides the objects other than the fixed object into an object that is farther away than the fixed object and an object that is closer than the fixed object with reference to the apparatus, sets the combination using the object that is farther away than the fixed object and the object that is closer than the fixed object, and calculates a degree of similarity in the change over time in the behavior for each set combination.

Supplementary Note 3

The object sensing apparatus according to Supplementary Note 1 or 2, wherein the behavior detection unit detects displacement of each of the objects as the behavior, based on a phase of the range spectrum.

Supplementary Note 4

The object sensing apparatus according to any one of Supplementary Notes 1 to 3, wherein the behavior detection unit detects a movement speed of each of the objects as the behavior, based on a Doppler frequency at a peak position of the range spectrum.

Supplementary Note 5

The object sensing apparatus according to any one of Supplementary Notes 1 to 4, wherein for each combination, the virtual image specifying unit calculates a correlation coefficient for the detected behavior as the degree of similarity.

Supplementary Note 6

The object sensing apparatus according to Supplementary Note 2, wherein the reception unit includes a plurality of antennas and generates the demodulated signal for each of the plurality of antennas, the object sensing apparatus further includes a direction detection unit configured to detect a direction of each of the objects based on the demodulated signal generated for each of the plurality of antennas, and based on the detected direction, the virtual image specifying unit selects a combination estimated to be a combination of an actual image and its virtual image from among the set combinations, and calculates a degree of similarity in the change over time in the behavior for the selected combination.

Supplementary Note 7

The object sensing apparatus according to Supplementary Note 2, wherein the emission unit includes a plurality of antennas, and for each of the plurality of antennas, the emission unit adds an identifier specifying the antenna to the RF transmission signal emitted from the antenna, the reception unit extracts the identifier added to the received RF reception signal, the object sensing apparatus further includes a direction detection unit configured to detect a direction of each of the objects based on the extracted identifier, and based on the detected directions, the virtual image specifying unit selects a combination estimated to be a combination of an actual image and its virtual image from among the set combinations, and calculates a degree of similarity in the change over time in the behavior for the selected combination.

Supplementary Note 8

An object sensing method, including (a) a step of emitting an RF transmission signal as an electromagnetic wave for object sensing;

(b) a step of receiving a reflected wave of the RF transmission signal as an RF reception signal, and using the RF transmission signal to generate a demodulated signal based on the RF reception signal;

(c) a step of calculating a range spectrum based on the demodulated signal and detecting an object that reflected the RF transmission signal and a distance from the object to the emitting position of the RF transmission signal or the receiving position of the RF reception signal based on the calculated range spectrum;

(d) a step of detecting behavior of the object based on the range spectrum;

(e) a step of specifying a fixed object from among detected objects based on the detected distance and behavior; and (f) a step of, if there are two or more objects other than the fixed object among the detected objects, calculating a degree of similarity in the change over time in the behavior for each combination of the objects other than the fixed object, and specifying a virtual image based on the calculated degree of similarity.

Supplementary Note 9

The object sensing method according to Supplementary Note 8, wherein in the (f) step, based on the distances detected for the objects, the objects other than the fixed object are divided into an object that is farther away than the fixed object and an object that is closer than the fixed object using the apparatus as a reference, the combination is set using the object that is farther away than the fixed object and the object that is closer than the fixed object, and a degree of similarity in the change over time in the behavior is calculated for each set combination.

Supplementary Note 10

The object sensing method according to Supplementary Note 8 or 9, wherein in the (d) step, displacement of each of the objects is detected as the behavior based on the phase of the range spectrum.

Supplementary Note 11

The object sensing apparatus according to any one of Supplementary Notes 8 to 10, wherein in the (d) step, a movement speed of each of the objects is detected as the behavior, based on a Doppler frequency at a peak position of the range spectrum.

Supplementary Note 12

The object sensing method according to any one of Supplementary Notes 8 to 11, wherein in the (f) step, for each combination, a correlation coefficient for the detected behavior is calculated as the degree of similarity.

Supplementary Note 13

The object sensing method according to Supplementary Note 9, wherein in the (b) step, the RF reception signal is received by a plurality of antennas, and the demodulated signal is generated for each of the plurality of antennas, the object sensing method further includes (g) a step of detecting a direction of each of the objects based on the demodulated signal generated for each of the plurality of antennas, and in the (f) step, based on the detected directions, a combination estimated to be a combination of an actual image and its virtual image is selected from among the set combinations, and a degree of similarity in the change over time in the behavior is calculated for the selected combination.

Supplementary Note 14

The object sensing method according to Supplementary Note 9, wherein in the (a) step, the RF transmission signal is emitted from a plurality of antennas, and furthermore, for each of the plurality of antennas, an identifier specifying the antenna is added to the RF transmission signal emitted from the antenna, in the (b) step, the identifier added to the received RF reception signal is extracted, the object sensing method further includes (h) a step of detecting a direction of each of the objects based on the extracted identifier, and in the (f) step, based on the detected directions, a combination estimated to be a combination of an actual image and its virtual image is selected from among the set combinations, and a degree of similarity in change over time in the behavior is calculated for the selected combination.

Supplementary Note 15

A computer readable recording medium in an object sensing apparatus including: an emission unit for emitting an RF transmission signal as an electromagnetic wave for object sensing; a reception unit for receiving a reflected wave of the RF transmission signal as an RF reception signal and using the RF transmission signal to generate a demodulated signal based on the RF reception signal; and a processor, the computer-readable storage medium including a program recorded thereon, the program including instructions that cause the processor to carry out:

(a) a step of calculating a range spectrum based on the demodulated signal and detecting an object that reflected the RF transmission signal and a distance from the object to the apparatus based on the calculated range spectrum;

(b) a step of detecting behavior of the object based on the range spectrum;

(c) a step of specifying a fixed object from among detected objects based on the detected distance and behavior; and (d) a step of, if there are two or more objects other than the fixed object among the detected objects, calculating a degree of similarity in change over time in the behavior for each combination of the objects other than the fixed object, and specifying a virtual image based on the calculated degree of similarity.

Supplementary Note 16

The computer readable recording medium according to Supplementary Note 15, wherein in the (c) step, based on the distances detected for the objects, the objects other than the fixed object are divided into an object that is farther away than the fixed object and an object that is closer than the fixed object using the apparatus as a reference, the combination is set using the object that is farther away than the fixed object and the object that is closer than the fixed object, and a degree of similarity in change over time in the behavior is calculated for each set combination.

Supplementary Note 17

The computer readable recording medium according to Supplementary Note 15 or 16, wherein in the (b) step, displacement of the object is detected as the behavior based on a phase of the range spectrum.

Supplementary Note 18

The computer readable recording medium according to any one of Supplementary Notes 15 to 17, wherein in the (b) step, a movement speed of the object is detected as the behavior based on a Doppler frequency at a peak position of the range spectrum.

Supplementary Note 19

The object sensing method according to any one of Supplementary Notes 8 to 11, wherein in the (c) step, a correlation coefficient of the detected behavior is calculated for each of the combinations as the degree of similarity.

Supplementary Note 20

The computer readable recording medium according to Supplementary Note 16, wherein the reception unit includes a plurality of antennas and generates the demodulated signal for each of the plurality of antennas, the program includes instructions that cause the processor to further execute (g) a step of detecting a direction of each of the objects based on the demodulated signal generated for each of the plurality of antennas, and in the (c) step, based on the detected direction, a combination estimated to be a combination of an actual image and its virtual image is selected from among the set combinations, and a degree of similarity in the change over time in the behavior is calculated for the selected combination.

Supplementary Note 21

The computer readable recording medium according to Supplementary Note 16, wherein the emission unit includes a plurality of antennas, and for each of the plurality of antennas, the emission unit adds an identifier specifying the antenna to the RF transmission signal emitted from the antenna, the reception unit extracts the identifier added to the received RF reception signal, the program includes instructions that cause the processor to further execute (h) a step of detecting a direction of each of the objects based on the extracted identifier, and in the (f) step, based on the detected directions, a combination estimated to be a combination of an actual image and its virtual image is selected from among the set combinations, and a degree of similarity in the change over time in the behavior is calculated for the selected combination.

Although the invention of the present application has been described above with reference to example embodiments, the invention of the present application is not limited to the above-described example embodiments. The configuration and details of the invention of the present application can be modified in various ways that can be understood by a person skilled in the art within the scope of the invention of the present application.

INDUSTRIAL APPLICABILITY

As described above, according to the present invention, in object sensing using radar, it is possible to specify a virtual object generated by an electromagnetic wave reflected by a fixed object without using complicated processing or a special apparatus. The present invention is useful in a field in which sensing of an object is performed using radar.

LIST OF REFERENCE SIGNS

1 Object sensing apparatus
10 Transmitter
11 Emission unit
20 Receiver
21 Reception unit
22 Distance detection unit
23 State detection unit
24 Fixed object specifying unit
25 Virtual image specifying unit
26 Detection processing unit
27 Direction detection unit
30 Fixed object
31 Object (actual image)
32 Object (virtual image)
110 Computer
111 CPU
112 Main memory
113 Storage apparatus
114 Interface
115 Display controller
116 Data reader/writer
117 Bus
118 Display apparatus
119 Recording medium

The invention claimed is:

1. An object sensing apparatus comprising:
an emission unit including a plurality of antennas that are each configured to emit an RF transmission signal as an electromagnetic wave for object sensing, the RF transmission signal emitted by each antenna including an added identifier specifying the antenna;
a reception unit configured to receive a reflected wave of the RF transmission signal as an RF reception signal, extract the added identifier, and use the RF transmission signal to generate a demodulated signal based on the RF reception signal;
a distance detection unit configured to calculate a range spectrum based on the demodulated signal, and detect a plurality of objects that reflected the RF transmission signal and a distance from the apparatus to each object based on the range spectrum;
a direction detection unit configured to detect a direction of each object based on the added identifier;
a behavior detection unit configured to detect behavior of each object based on the range spectrum;
a fixed object specifying unit configured to specify a fixed object from among the objects based on the distance to each object and the behavior of each object; and
a virtual image specifying unit configured to, in a case in which there are two or more objects other than the fixed object among the objects;
  divide the objects other than the fixed object into one or more combinations that each include an object that is farther away than the fixed object and an object that is closer than the fixed object with reference to the object sensing apparatus;
  for each combination, calculate a degree of similarity in change over time between the behavior of each object in the combination;
  for each combination, specify a virtual image based on the degree of similarity; and
  based on the direction of each object, select the combination estimated to correspond to an actual image and the virtual image.

2. The object sensing apparatus according to claim 1, wherein
the behavior detection unit detects displacement of each object as the behavior, based on a phase of the range spectrum.

3. The object sensing apparatus according to claim 1, wherein
the behavior detection unit detects a movement speed of each object as the behavior, based on a Doppler frequency at a peak position of the range spectrum.

4. The object sensing apparatus according to claim 1, wherein
for each combination, the virtual image specifying unit calculates a correlation coefficient for the behavior of each object in the combination as the degree of similarity.

5. The object sensing apparatus according to claim 1, wherein
the antennas of the emission unit are first antennas,
the reception unit includes a plurality of second antennas and generates the demodulated signal for each second antenna, and
the direction detection unit detects the direction of each object based further on the demodulated signal generated for each second antennas.

6. An object sensing method comprising:
emitting an RF transmission signal by each of a plurality of antennas as an electromagnetic wave for object sensing, the RF transmission signal emitted by each antenna including an added identifier specifying the antenna;
receiving a reflected wave of the RF transmission signal as an RF reception signal, extracting the added identifier, and using the RF transmission signal to generate a demodulated signal based on the RF reception signal;
calculating a range spectrum based on the demodulated signal and detecting a plurality of objects that reflected the RF transmission signal and a distance to each object based on the range spectrum;
detecting a direction of each object based on the added identifier;
detecting behavior of each object based on the range spectrum;
specifying a fixed object from among the objects based on the distance to each object and the behavior of each object; and
in a case in which two or more objects other than the fixed object among the detected objects:
  dividing the objects other than the fixed objects into one or more combinations that each include an object that is farther away than the fixed object and an object that is closer to the fixed object;
  for each combination, calculating a degree of similarity in change over time between the behavior of each object in the combination;
  for each combination, specifying a virtual image based on the degree of similarity; and
  based on the direction of each object, select the combination estimated to correspond to an actual image and the virtual image.

7. A non-transitory computer readable recording medium in an object sensing apparatus, the non-transitory computer readable recording medium including a program recorded thereon, the program including instructions that cause the object sensing apparatus to carry out:
emitting an RF transmission signal by each of a plurality of antennas as an electromagnetic wave for object sensing, the RF transmission signal emitted by each antenna including an added identifier specifying the antenna;
receiving a reflected wave of the RF transmission signal as an RF reception signal, extracting the added identifier, and using the RF transmission signal to generate a demodulated signal based on the RF reception signal;
calculating a range spectrum based on the demodulated signal and detecting a plurality of objects that reflected the RF transmission signal and a distance to each object based on the range spectrum;
detecting a direction of each object based on the added identifier;
detecting behavior of each object based on the range spectrum;
specifying a fixed object from among the objects based on the distance to each object and the behavior of each object; and
in a case in which two or more objects other than the fixed object among the detected objects:
  dividing the objects other than the fixed objects into one or more combinations that each include an object that is farther away than the fixed object and an object that is closer to the fixed object;
  for each combination, calculating a degree of similarity in change over time between the behavior of each object in the combination;
  for each combination, specifying a virtual image based on the degree of similarity; and
  based on the direction of each object, select the combination estimated to correspond to an actual image and the virtual image.

* * * * *